United States Patent
Zhu et al.

(10) Patent No.: US 7,957,611 B2
(45) Date of Patent: Jun. 7, 2011

(54) IMAGE SCALER WITH CONTROLLABLE SHARPNESS

(75) Inventors: Ge Zhu, Shanghai (CN); Qi Zhang, Shanghai (CN); Chieh-Te Chang, Shanghai (CN)

(73) Assignee: Huaya, Microelectronics, Ltd., San Jose, CA (US)

( * ) Notice: Subject to any disclaimer, the term of this patent is extended or adjusted under 35 U.S.C. 154(b) by 1349 days.

(21) Appl. No.: 11/372,395

(22) Filed: Mar. 9, 2006

(65) Prior Publication Data

US 2006/0274089 A1 Dec. 7, 2006

(30) Foreign Application Priority Data

Mar. 11, 2005 (CN) ......................... 2005 1 00243324

(51) Int. Cl.
*G06K 9/32* (2006.01)
*G06K 9/40* (2006.01)
*G09G 5/00* (2006.01)
*H04N 7/01* (2006.01)
*H04N 11/20* (2006.01)

(52) U.S. Cl. ........ 382/300; 382/254; 382/263; 382/264; 382/293; 345/660; 345/665; 348/441

(58) Field of Classification Search .................. 382/266, 382/300
See application file for complete search history.

(56) References Cited

U.S. PATENT DOCUMENTS

| 5,054,100 | A | * | 10/1991 | Tai ................................. | 382/300 |
| 6,825,857 | B2 | * | 11/2004 | Harasimiuk ................... | 345/660 |
| 7,046,862 | B2 | * | 5/2006 | Ishizaka et al. ............... | 382/298 |
| 7,391,933 | B2 | * | 6/2008 | Wang et al. .................... | 382/300 |
| 7,508,997 | B2 | * | 3/2009 | Wang et al. .................... | 382/300 |
| 2005/0025388 | A1 | * | 2/2005 | Damera-Venkata et al. . | 382/300 |
| 2005/0078884 | A1 | * | 4/2005 | Yi ................................. | 382/300 |

FOREIGN PATENT DOCUMENTS

EP 1308887 A1 * 5/2003

* cited by examiner

*Primary Examiner* — Brian Q Le
*Assistant Examiner* — Jose M Torres
(74) *Attorney, Agent, or Firm* — Silicon Valley Patent Group, LLP; Edward S. Mao

(57) ABSTRACT

A method and system for scaling an original image into a scaled image is disclosed. Rather than using the corresponding position in the original image to generate the pixels values of a current pixel in the scaled image, image scalers in accordance with the present invention, calculate a high frequency adjusted position based on the high frequency components of pixels near the corresponding position. Pixel values based on the high frequency adjusted position provide better picture quality for the scaled image than pixel values based on the corresponding position. Furthermore, some embodiments of the present invention also use sharpness compensation to further improve the picture quality of the scaled image.

64 Claims, 6 Drawing Sheets

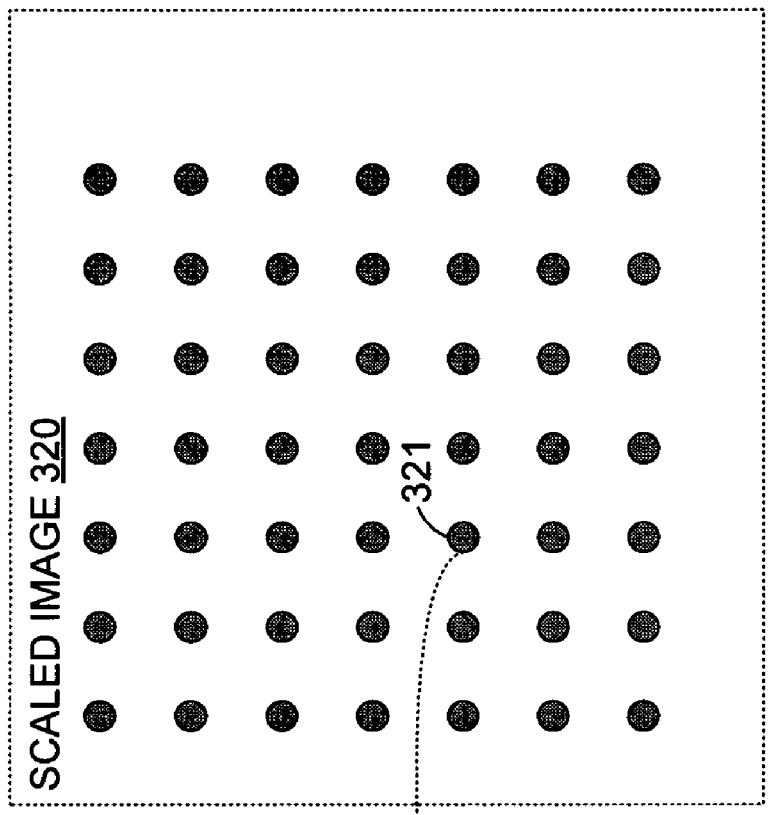
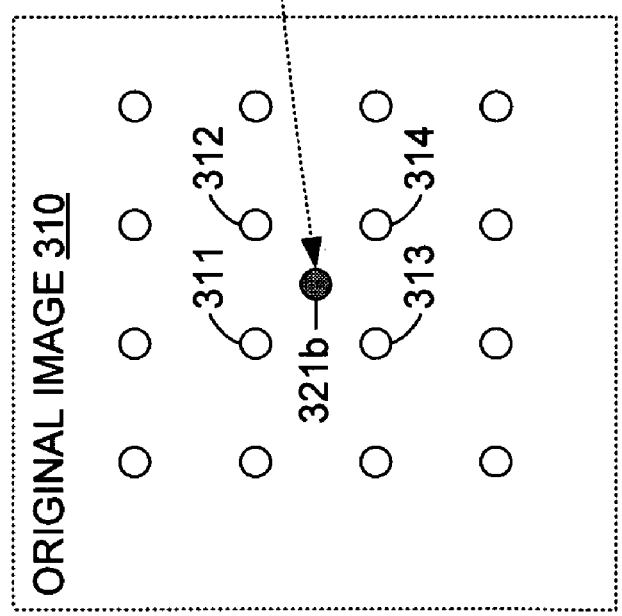
FIG. 3

IMAGE SCALER WITH CONTROLLABLE SHARPNESS

BACKGROUND OF THE INVENTION

1. Field of the Invention

The present invention relates to digital image and video processing. More specifically, the present invention relates to methods of scaling images with controllable sharpness to reduce blurring, grain effects, and saw tooth effects.

2. Discussion of Related Art

Due to advancing semiconductor processing technology, integrated circuits (ICs) have greatly increased in functionality and complexity. With increasing processing and memory capabilities, many formerly analog tasks are being performed digitally. For example, many digital display systems, such as Liquid Crystal Displays (LCDs), micro mirror systems, and plasma displays, are being used in place of analog television sets. These digital display systems have a set number of pixels, i.e. the native display resolution. For example, large screen LCDs may have a native resolution as high as 1920×1080 pixels. However small portable digital display system may have native display resolution as low as 320×200 pixels.

Various video formats have different resolutions. For example, NTSC resolution is 720×480, PAL resolution is 720×576, HDTV standards include 1920×1080, 1280×720, and 640×480, etc. To correctly display a video signal, the digital display system must resize the images of the video signal for the native display resolution. For example as illustrated in FIG. 1, an image 110 is scaled up (i.e. enlarged) for a large display 120. Conversely as illustrated in FIG. 2, image 110 is scaled down (i.e. reduced) for a small display 220.

In the scaling process each pixel of the scaled image is generated by determining a corresponding position in the original image and generating values for the pixel of the scaled image based on the pixels of the original image near the corresponding position. For example as illustrated in FIG. 3, pixel 321 in scaled image 320 corresponds to a corresponding position 321b that is located between pixels 311, 312, 313, and 314 of original image 310. Some conventional scalers calculate pixel values, e.g. luminance, U chrominance, and V chrominance values in YUV format, for pixel 321 by copying the corresponding values of the pixel in original image 310 that is nearest to corresponding position 321b. Other conventional scalers use bi-linear interpolation based on the values of the 4 pixels nearest corresponding position 321b, i.e., pixels 311, 312, 313, and 314. Other pixel formats could also be used such as RGB. For clarity, the present invention is described using YUV format, however one skilled in the art can easily adapt the teachings presented herein for other pixel formats.

The corresponding position to a pixel of the scaled image can be calculated using the location of the pixel in the scaled image and a horizontal scaling factor HSF and a vertical scaling factor VSF. The scaling factors are based on the relative dimensions of original image to the scaled image. For clarity, the examples described herein use an original image having I pixels in each row and J pixels in each column. The scaled image has X pixels in each row and Y pixels in each column. A pixel $P(x, y)$ in the scaled image is the pixel in the x-th column, and y-th row of the scaled image, where pixel $P(0,0)$ is the top left pixel and pixel $P(X-1, Y-1)$ is the bottom right pixel of the scaled image. Horizontal scaling factor HSF is equal to the horizontal dimension of the original image (in pixels) minus one divided by the horizontal dimension of the scaled image (in pixels) minus one, i.e. $HSF=(I-1)/(X-1)$. However, many systems simplify the calculation of horizontal scaling factor HSF by using the horizontal dimension of the original image (in pixels) divided by the horizontal dimension of the scaled image, i.e. $HSF=I/X$. Similarly, vertical scaling factor VSF is equal to the vertical dimension of the original image (in pixels) minus one divided by the vertical dimension of the scaled image (in pixels) minus one, i.e. $VSF=(J-1)/(Y-1)$. However, many systems simplify the calculation of vertical scaling factor VSF by using the vertical dimension of the original image (in pixels) divided by the vertical dimension of the scaled image, i.e. $VSF=J/Y$.

The corresponding position of pixel $P(x, y)$ is defined with a horizontal position $HP(x)$ and a vertical position $VP(y)$. Horizontal position $HP(x)$ is equal to x multiplied by horizontal scaling factor HSF (i.e., $HP(x)=x*HSF$). Vertical position $VP(y)$ is equal to y multiplied by vertical scaling factor VSF (i.e., $VP(y)=y*VSF$).

As digital displays become larger, flaws of conventional scalers become magnified. For example, images that are scaled up (enlarged) become blurred because individual pixel values from the original image are combined to form the scaled image. Thus, the effect of scaling up an image has the effect of applying a low-pass filter to the image, which reduces the sharpness of the scaled image as compared to the original image. In zero-th order scalers, blurring is not as prevalent, however blockiness in the scaled image becomes a problem. The blockiness is caused by copying a single pixel of the original image to multiple adjacent pixels in the scaled image.

Another flaw of conventional scalers is saw tooth artifacts along diagonal lines in a scaled-up image. Theoretically, saw tooth artifacts are present along diagonal lines in all digital images due to finite resolution. Normally, the saw tooth artifacts are not visible in high-resolution images. However, when an image is scaled up, the values of the pixels in the original image are used to calculate multiple pixels in the scaled image, which may enlarge the saw tooth artifacts.

Scaling down of images also produces flaws in the scaled image. For examples scaling down (i.e. reducing) an image may produce a scaled image that is grainy. Specifically, scaling down has the effect of applying a high-pass filter to an image, which would emphasize rapid transitions within an image, which results in a grainy image.

Hence, there is a need for a method or system that can efficiently scale an image without the flaws of conventional scalers that may produce saw toothed, blurry, blocky, or grainy scaled images.

SUMMARY

Accordingly, the present invention provides a method and system for scaling an image that uses a high frequency adjusted position rather than the corresponding position of a current pixel during scaling. The high frequency adjusted position is calculated based on the high frequency components of the pixels near the corresponding position. By accounting for the high frequency components of nearby pixels, image scalers according to the present invention produce scaled images of higher quality than conventional scalers. Furthermore, some embodiments of the present invention also use an adjustable sharpness compensation to further reduce flaws that are common to conventional scalers.

In accordance with the present invention an image scaler, configured to produce a scaled image from an original image, calculates a corresponding position in the original image for a current pixel of the scaled image. The corresponding position includes a horizontal position and a vertical position. The image scaler also calculates a high frequency adjusted position, which includes a high frequency adjusted horizontal position and a high frequency adjusted vertical position, in the original image for the current pixel. Pixel values for the current pixel are generated by the image scaler using the high frequency adjusted position rather than the corresponding position. Generally, the high frequency adjusted position is moved horizontally in a horizontal direction of larger horizontal high frequency components and is moved vertically in a vertical direction of larger vertical high frequency components.

Some embodiments of the present invention also use sharpness compensation to improve the quality of the scaled image. In these embodiments, the sharpness compensation is proportional to an interpolation at the high frequency adjusted position of high frequency components of pixels near the corresponding position. For example, one specific embodiment of the present invention calculates the sharpness compensation using a bilinear interpolation at the high frequency adjusted position of the high frequency components of the four pixels nearest the corresponding position. The sharpness compensation is added to the luminance value of the current pixel.

The present invention will be more fully understood in view of the following description and drawings.

BRIEF DESCRIPTION OF THE DRAWINGS

FIG. 3 illustrates the relationship between a pixel of a scaled image and the corresponding position of the pixel in an original image.

DETAILED DESCRIPTION

As explained above, conventional scaling techniques may cause blurring, blocking, and saw tooth artifacts in an up-scaled (i.e., enlarged) image and may cause excessive graininess in a down-scaled (i.e., reduced) image. To reduce saw tooth artifacts, the present invention uses a high frequency adjusted position in place of the corresponding position to generate a pixel $P(x, y)$ of the scaled image. Specifically, the high frequency adjusted position is moved horizontally in the direction of the larger magnitude of horizontal high frequency components. Similarly the high frequency adjusted position is moved vertically in the direction of the larger magnitude of vertical high frequency components. The amount of movement is proportional to the high-frequency components of the neighboring pixels. Furthermore, the present invention adjusts the sharpness of the scaled image to reduce the flaws of the scaled image. Specifically, the present invention calculates a sharpness compensation value, which is used in generating the pixels of the scaled image.

Figure 1:
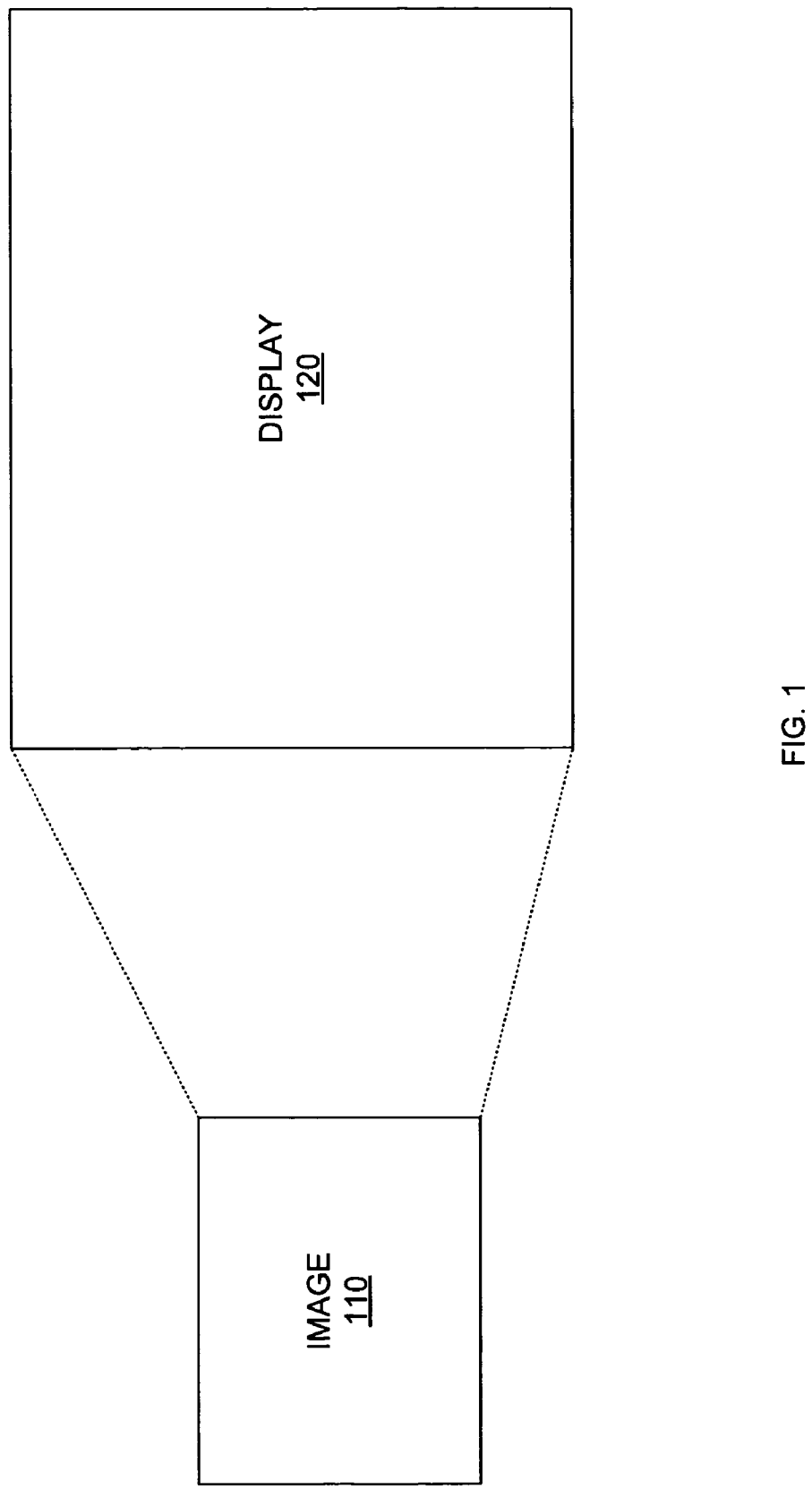
FIG. 1 is an illustration of up-scaling an image.
Figure 2:
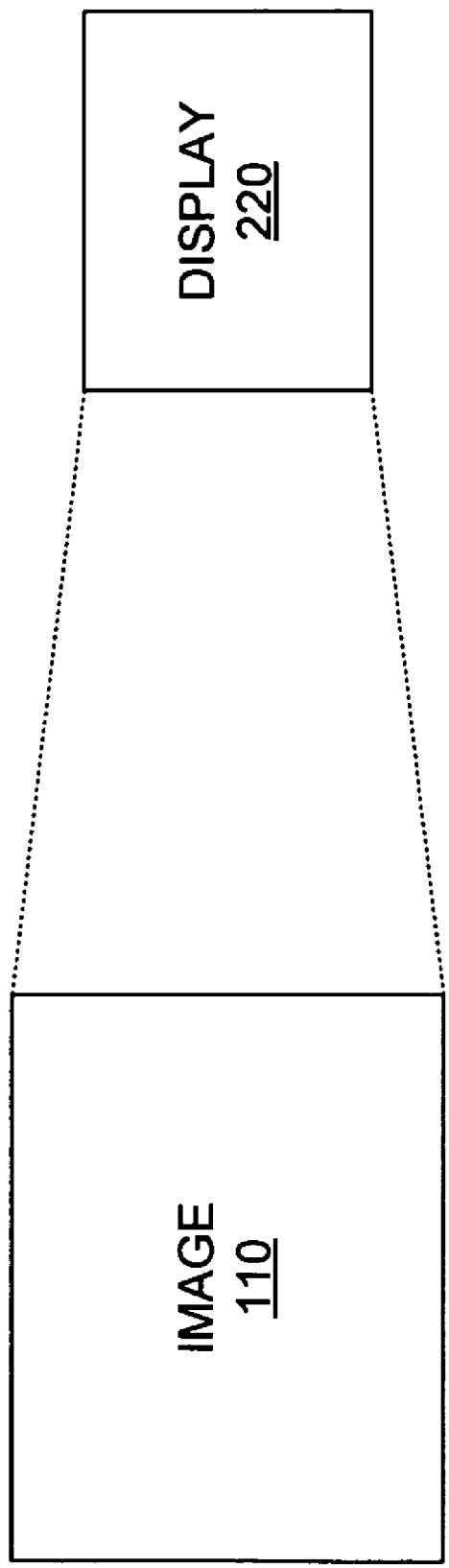
FIG. 2 is an illustration of down-scaling an image.
Figure 4:
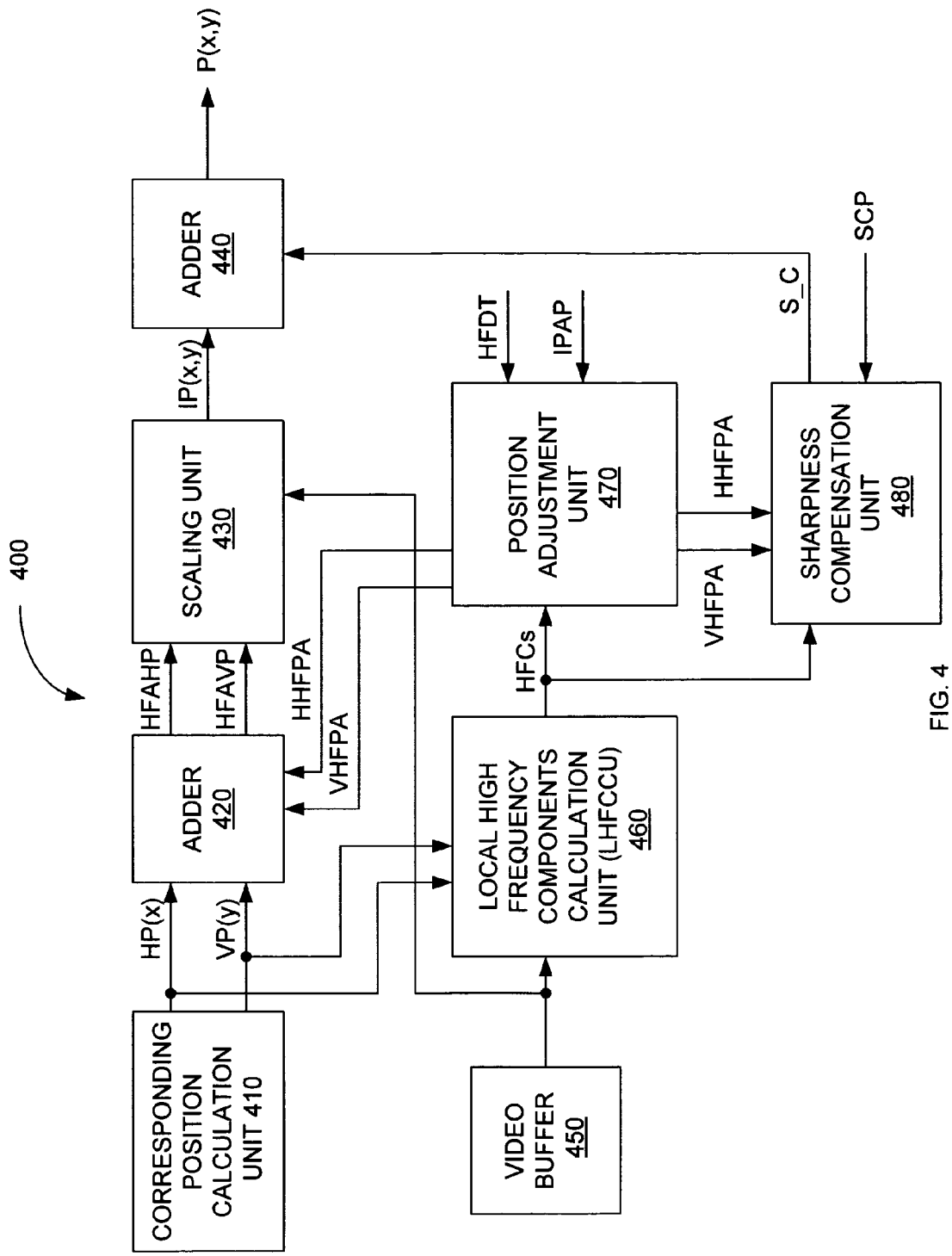
FIG. 4 is a block diagram of one embodiment of the present invention.

FIG. 4 is a block diagram of an image scaler 400 in accordance with one embodiment of the present invention. Image scaler 400 includes a corresponding position calculation unit 410, an adder 420, a scaling unit 430, an adder 440, a video buffer 450, a local high frequency components calculation unit (LHFCCU) 460, a position adjustment unit 470, and a sharpness compensation unit 480. Image scaler 400 generates the pixels of the scaled image using data from the original image that is stored in video buffer 450. To minimize the size of video buffer 450, the scaled image is generated line by line (and pixel by pixel within each line) so that only a few lines of pixels are stored in video buffer 450. In general a line of pixels corresponds to a line buffer in video buffer 450. The number of lines of pixels stored in video buffer 450 depends on the scaling technique used in scaling unit 430 and the high frequency components calculation techniques used in local high frequency components calculation unit 460. Video buffer 450 is typically implemented as a circular buffer, which maintains the number of lines of pixel data that are necessary for the computations used in the scaling techniques and local high frequency components calculation. However, extra line buffers may be needed for pre-loading of future data. Thus, for example an embodiment of the present invention that requires four lines of pixels for computations may have a video buffer that includes more than four line buffers.

To generate a pixel $P(x, y)$ of the scaled image, corresponding position calculation unit 410 calculates horizontal position $HP(x)$ and vertical position $VP(y)$ of the corresponding position CP (see FIG. 5) of pixel $P(x, y)$, as described above. Adder 420 adds a horizontal high frequency position adjustment HHFPA to horizontal position $HP(x)$ to generate a high-frequency adjusted horizontal position HFAHP. Adder 420 also adds a vertical high-frequency position adjustment VHFPA to vertical position $VP(y)$ to generate a high-frequency adjusted vertical position HFAVP. Horizontal high frequency position adjustment HHFPA and vertical high frequency position adjustment VHFPA are generated by position adjustment unit 470 as described below. High frequency adjusted horizontal position HFAHP and high frequency adjusted vertical position HFAVP are the coordinates of high frequency adjusted position HFAP (see FIG. 5).

Figure 5:
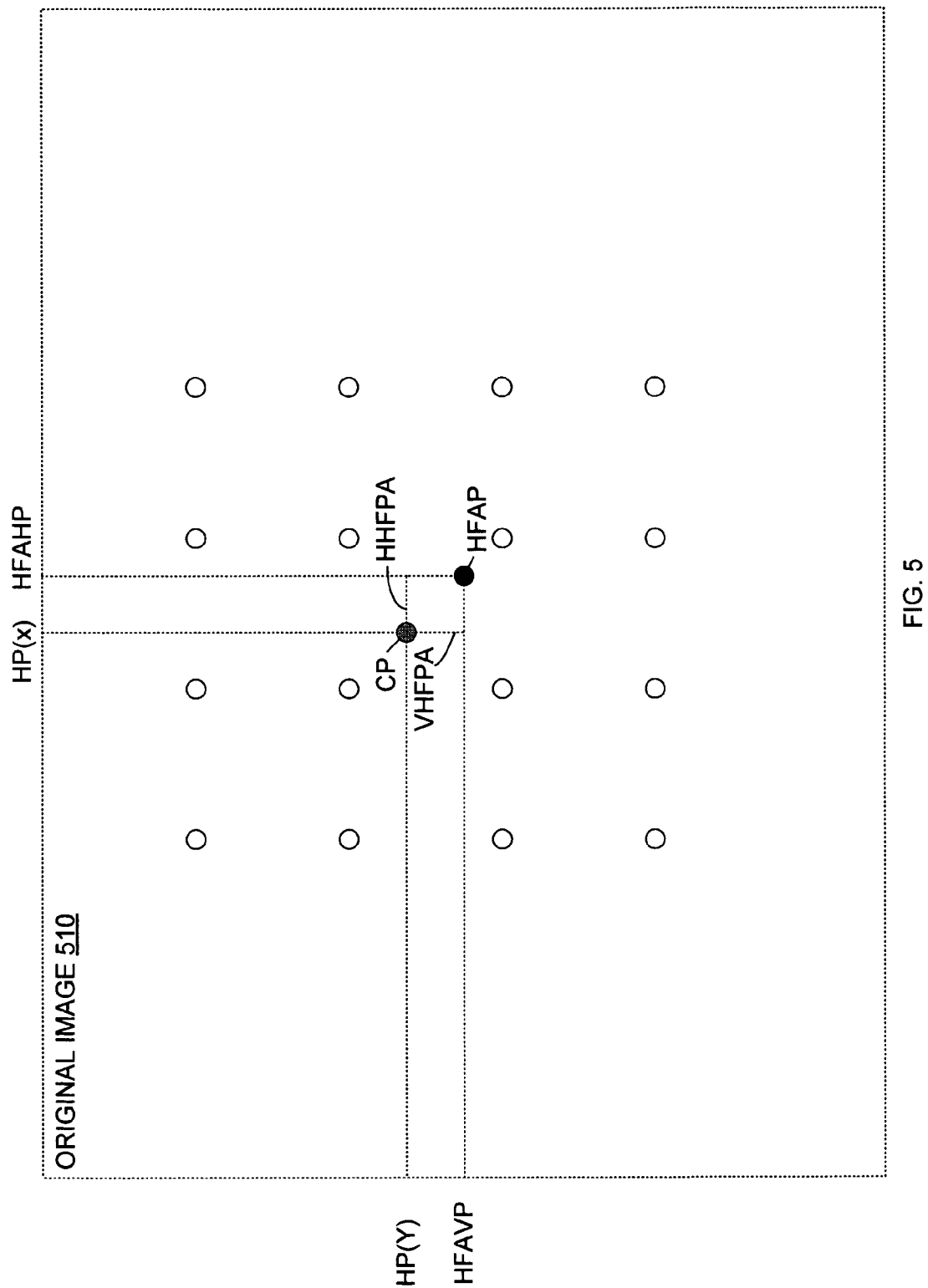
FIG. 5 illustrates the relationship of a high frequency adjusted position and a corresponding position in accordance with one embodiment of the present invention.

FIG. 5 illustrates the relationship between corresponding position CP and high frequency adjusted position HFAP. Specifically, corresponding position CP is located at horizontal position $HP(x)$ and vertical position $VP(y)$ while high frequency adjusted position HFAP is located at high frequency adjusted horizontal position HFAHP and high frequency adjusted vertical position HFAVP. High frequency adjusted horizontal position HFAHP is equal to horizontal position $HP(x)$ plus horizontal high frequency position adjustment HHFPA (i.e., HFAHP=HP(x)+HHFPA). High frequency adjusted vertical position HFAVP is equal to vertical position $VP(x)$ plus vertical high frequency position adjustment VHFPA (i.e., HFAVP=VP(y)+VHFPA).

Returning to FIG. 4, scaling unit 430 generates an intermediate pixel $IP(x, y)$ using high frequency adjusted horizontal position HFAHP, high frequency adjusted vertical position HFAVP, and the pixels of the original image stored in video buffer 450. The specific scaling technique used by scaling unit 430 is not an integral part of the present invention. For example, some embodiments of the present invention use bi-linear scaling, other embodiments use zero-th order scaling, and still other embodiments may use bi-cubic, splines or other well-known scaling techniques. In most embodiments of the present invention, scaling unit 430 uses high frequency adjusted horizontal position HFAHP and high frequency adjusted vertical position HFAVP for generating both luminance and chrominance values for intermediate pixel $IP(x, y)$. However, some embodiments of the present invention use horizontal position $HP(x)$ and vertical position $VP(y)$ for chrominance values.

Adder 440 adds a sharpness compensation S_C to the luminance portion of the intermediate pixel value $IP(x, y)$ to generate the luminance portion of pixel $P(x, y)$ for the scaled image. Sharpness compensation S_C is generated by sharpness compensation unit 480 as described below. The chrominance portions of intermediate pixel value IP(x, y) are not affected by sharpness compensation S_C.

Figure 6:
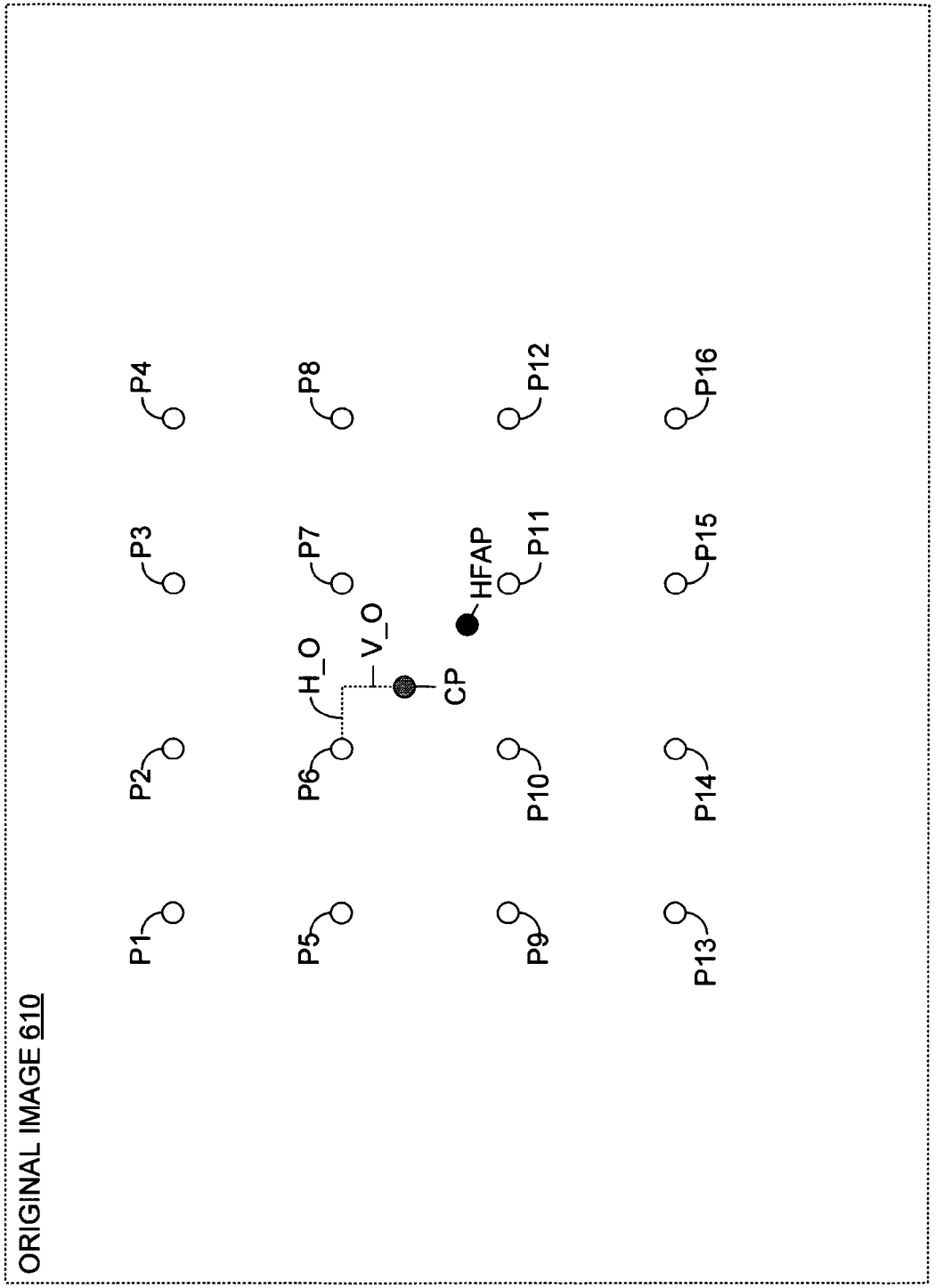
FIG. 6 illustrates the pixels surrounding a corresponding position and a high frequency adjusted position in accordance with one embodiment of the present invention.

Local high frequency components calculation unit 460 calculates high frequency components for the pixels neighboring corresponding position CP. For clarity the nomenclature for the pixels neighboring corresponding position CP are illustrated in FIG. 6. Specifically, the four pixels closest to corresponding position CP are referenced as P6, P7, P10, and P11, where pixel P6 is above and to the left of corresponding position CP, pixel P7 is above and to the right of corresponding position CP, pixel P10 is below and to the left of corresponding position CP, and pixel P11 is below and to the right of corresponding position CP. Furthermore, the next twelve closest pixels to corresponding position CP are referenced with P1, P2, P3, P4, P5, P8, P9, P12, P13, P14, P15, and P16. Therefore, the 16 closest pixels to corresponding position CP, which are laid out in 4 rows of 4 pixels, are referenced sequentially from left to right top to bottom as illustrated in FIG. 6. Corresponding position CP is offset from pixel P6 by a horizontal offset H_O and a vertical offset V_O. If corresponding position CP is exactly on a pixel, then that pixel is used as pixel P6. Thus, horizontal offset H_O and vertical offset V_O would both be equal to zero.

Local high frequency component calculation unit 460 calculates the local high frequency component for each of the four closest pixels to corresponding position CP, i.e. for pixels P6, P7, P10, and P11. Various techniques can be used to calculate the local high frequency components. Specifically, the local high frequency component at a pixel is equal to a high pass filter result at the pixel. Thus, any high pass filter, such as Laplacian Operator or difference of Gaussians, could be used to calculate local high frequency components. In some embodiments of the present invention, local high frequency components calculation unit 460 calculates both a horizontal high frequency component and a vertical high frequency component for pixels P6, P7, P10, and P11. In a particular embodiment of the present invention, the horizontal high frequency component of a specific pixel is equal to two times luminance of the specific pixel minus the luminance of the pixel to the left of the specific pixel minus the luminance of the pixel to the right of the specific pixel. For example, the horizontal high frequency component for pixel P6 (i.e., HHFC6) is equal to the two times the luminance of pixel P6 minus the luminance of pixel P5 minus the luminance of pixel P7. For clarity the luminance of a pixel Pt is referenced as luminance Yt. For example, the luminance of pixel p6 is referenced as luminance Y6. Equations EQ1a, EQ2a, EQ3a, and EQ4a show symbolically how to calculate horizontal high frequency components HHFC6, HHFC7, HHFC10, and HHFC11, for pixels P6, P7, P10, and P11, respectively, for this embodiment of the present invention.

$$HHFC6 = 2*Y6 - Y5 - Y7 \quad (EQ1a)$$

$$HHFC7 = 2*Y7 - Y6 - Y8 \quad (EQ2a)$$

$$HHFC10 = 2*Y10 - Y9 - Y11 \quad (EQ3a)$$

$$HHFC11 = 2*Y11 - Y10 - Y12 \quad (EQ4a)$$

For the embodiment of the present invention using equations EQ1a, EQ2a, EQ3a, and EQ4a, the vertical high frequency component of a specific pixel is equal to two times luminance of the specific pixel minus the luminance of the pixel above the specific pixel minus the luminance of the pixel below the specific pixel. For example, the vertical high frequency component of pixel P6 (i.e., VHFC6) is equal to two times the luminance of pixel P6 minus the luminance of pixel P2 minus the luminance of pixel P10. Equations EQ1b, EQ2b, EQ3b, and EQ4b shows symbolically how to calculate vertical high frequency components VHFC6, VHFC7, VHFC10, and VHFC11, for pixels P6, P7, P10, and P11, respectively $$VHFC6 = 2*Y6 - Y2 - Y10 \quad (EQ1b)$$

$$VHFC7 = 2*Y7 - Y3 - Y11 \quad (EQ2b)$$

$$VHFC10 = 2*Y10 - Y6 - Y14 \quad (EQ3b)$$

$$VHFC11 = 2*Y11 - Y7 - Y15 \quad (EQ4b)$$

As explained above, local high frequency components can be calculated in a variety of techniques. The equation EQ1a, EQ1b, EQ2a, EQ2b, EQ3a, EQ3b, EQ4a, and EQ4b are for one particular embodiment of the present invention. One skilled in the art can use the principles of the present invention with other techniques to calculate local high frequency components.

At or near the edges of an image, local high frequency components cannot be defined for every direction. For example, at the bottom of the image, pixels P13, P14, P15, and P16 are not available for calculating the local high frequency components. For most embodiments of the present invention, when the local high frequency components can not be calculated for a pixel of the scaled image, high frequency adjusted position HFAP remains with corresponding position CP.

The high frequency components (HFCs) generated by local high frequency components calculation unit 460 are provided to position adjustment unit 470 and sharpness compensation unit 480. Position adjustment unit 470 calculates horizontal high frequency position adjustment HHFPA and vertical high frequency position adjustment VHFPA. As explained above, high frequency adjusted position HFAP should be moved horizontally in the direction of the larger magnitude of horizontal high frequency components and vertically in the direction of the larger magnitude of vertical high frequency components. Therefore, position adjustment unit 470 calculates horizontal high frequency position adjustment HHFPA and vertical high frequency position adjustment VHFPA.

To calculate horizontal high frequency position adjustment HHFPA, position adjustment unit 470 calculates a left high frequency component LHFC, which is equal to a weighted sum of the horizontal high frequency components of the two closest pixels to the left of current position CP, i.e. pixels P6 and P10. Specifically, left high frequency component LHFC is equal to the product of horizontal high frequency component HHFC6 of pixel P6 with the difference between one and vertical offset V_O plus the product of horizontal high frequency component HHFC10 of pixel P10 with vertical offset V_O. Equation EQ5 shows symbolically how to calculate left high frequency component LHFC.

$$LHFC = HHFC6*(1-V\_O) + HHFC10*V\_O \quad (EQ5)$$

Similarly, position adjustment unit 470 calculates a right high frequency component RHFC, which is equal to a weighted sum of the horizontal high frequency components of the two closest pixels to the right of current position CP, i.e. pixels P7 and P11. Specifically, right high frequency component RHFC is equal to the product of horizontal high frequency component HHFC7 of pixel P7 with the difference between one and vertical offset V_O plus the product of horizontal high frequency component HHFC11 of pixel P11 with vertical offset V_O. Equation EQ6 shows symbolically how to calculate right high frequency component RHFC.

$$RHFC = HHFC7*(1-V\_O) + HHFC11*V\_O \quad (EQ6)$$

As explained above high frequency adjusted position HFAP is moved horizontally in the direction of the larger magnitude of horizontal high-frequency component. The magnitude of a horizontal high-frequency component is equal to the absolute value of the horizontal high frequency component. Thus, when the absolute value of right high frequency component RHFC is greater than the absolute value of left high frequency component LHFC then the high frequency adjusted position HFAP should be moved to the right of corresponding position CP. Conversely, when the absolute value of right high frequency component RHFC is less than the absolute value of left high frequency component LHFC then the high frequency adjusted position HFAP should be moved to the left of corresponding position CP. However, when the absolute value of right high frequency component RHFC is equal to the absolute value of left high frequency component LHFC then the high frequency adjusted position HFAP should not be moved horizontally from corresponding position CP and horizontal high frequency position adjustment HHFPA should be equal to zero.

The amount of horizontal high frequency position adjustment is in proportion to the absolute difference between absolute left-side and absolute right-side high frequency components. Therefore, position adjustment 470 calculates a horizontal high frequency difference HHFD, which is equal to the absolute value of the difference between the absolute value of right high frequency component RHFC and the absolute value of left high frequency component LFHC. Equation EQ7 shows symbolically how to calculate horizontal high frequency difference HHFD.

$$HHFD = ||RHFC| - |LHFC|| \quad (EQ7)$$

To provide greater user control, two user configurable parameters are used in the calculation of horizontal high frequency position adjustment HHFPA. The first user configurable parameter is a high frequency difference threshold HFDT, which limits the amplitude of horizontal high frequency difference HHFD. Specifically, if horizontal high frequency difference HHFD is greater than high frequency difference threshold, then horizontal high frequency difference HHFD is reset to be equal to high frequency difference threshold. Because high frequency difference threshold HFDT is used as a divisor (as explained below) using a power of 2 for high frequency difference threshold would simplify the circuits required for calculating horizontal high frequency position adjustment HHFPA. Alternatively, a register configured with the reciprocal of high frequency difference threshold HFDT (i.e., 1/HFDT) could be used to avoid using high frequency difference threshold HFDT as a divisor. Specifically, instead of dividing by high frequency difference threshold HFDT multiplying by the reciprocal of high frequency difference threshold HFDT is performed. In one embodiment of the present invention high frequency difference threshold HFDT has a default value of 16.

The second user configurable parameter is an interpolation point adjustment parameter IPAP, which has a range of 0 to 1, inclusive. IPAP is used to further control the adjustment of high frequency adjusted position HFAP. The amount of adjustment is proportional to interpolation point adjustment parameter IPAP. When interpolation point adjustment parameter IPAP is equal to zero, adjustment of high frequency adjusted position HFAP is eliminated. Generally, the default value of interpolation point adjustment parameter IPAP is equal to 0.5

The magnitude of horizontal position adjustment MHPA is equal to horizontal scaling factor HSF multiplied by interpolation adjustment parameter IPAP, multiplied by horizontal high frequency difference HHFD divided by high frequency difference threshold HFDT. As explained above, dividing by high frequency difference threshold HFDT can be avoided by multiplying with the reciprocal of high frequency difference threshold HFDT. In equation EQ8, horizontal scaling factor HSF is equivalent to a "horizontal step" between two pixels of the scaled image. Equation EQ8 shows symbolically how to calculate magnitude of horizontal position adjustment MHPA.

$$MHPA = HSF*IPAP*(HHFD/HFDT) \quad (EQ8)$$

When the absolute value of right high frequency component RHFC is greater than the absolute value of left high frequency component LHFC then the high frequency adjusted position HFAP should be moved to the right of corresponding position CP. However in most embodiments of the present invention, high frequency adjusted position HFAP should not move beyond pixels P6, P7, P10, and P11 because additional pixels would be needed to for interpolation. For example, if high frequency adjusted position HFAP is moved below P10 and P11, the pixels below pixels P14 and P15 would be needed for interpolation and extra line buffers would be required in the video buffer. Therefore, when the absolute value of right high frequency component RHFC is greater than the absolute value of left high frequency component LHFC and one minus horizontal offset H_O is greater than or equal to magnitude of horizontal position adjustment MHPA then horizontal high frequency position adjustment HHFPA is equal to magnitude of horizontal position adjustment MHPA. However, when the absolute value of right high frequency component RHFC is greater than the absolute value of left high frequency component LHFC and one minus horizontal offset H_O is less than magnitude of horizontal position adjustment MHPA then horizontal high frequency position adjustment HHFPA is equal to one minus horizontal offset H_O.

Conversely, when the absolute value of right high frequency component RHFC is less than the absolute value of left high frequency component LHFC then the high frequency adjusted position HFAP should be moved to the left of corresponding position CP. However, high frequency adjusted position HFAP can not move beyond pixels P6 and P10 in the horizontal direction. Therefore, when the absolute value of right high frequency component RHFC is less than the absolute value of left high frequency component LHFC and horizontal offset H_O is greater than magnitude of horizontal position adjustment MHPA then horizontal high frequency position adjustment HHFPA is equal to magnitude of horizontal position adjustment MHPA multiplied by negative one. However, if horizontal offset H_O is less than magnitude of horizontal position adjustment MHPA, horizontal high frequency position adjustment HHFPA is equal to horizontal offset H_O multiplied by negative one.

When the absolute value of right high frequency component RHFC is equal to the absolute value of left high frequency component LHFC then the high frequency adjusted position HFAP should not be moved from corresponding position CP and horizontal high frequency adjustment HHFPA should be equal to zero.

Table 1 provides a pseudo code listing which shows symbolically how to calculate horizontal high frequency position adjustment HHFPA.

TABLE 1

```
{
IF |LHFC| > |RHFC| then
   {
   IF H_O >= MHPA then HHFPA = −MHPA
   ELSE HHFPA = − H_O;
   }
ELSE IF |LHFC| < |RHFC| then
   {
   IF (1− H_O) >= MHPA then HHFPA = MHPA
   ELSE HHFPA = (1 − H_O) ;
   }
ELSE IF |LHFC| = |RHFC| then HHFPA = 0;
}
```

To calculate vertical high frequency position adjustment VHFPA, position adjustment unit 470 calculates a top high frequency component THFC, which is equal to a weighted sum of the vertical high frequency components of the two closest pixels above of current position CP, i.e. pixels P6 and P7. Specifically, top high frequency component THFC is equal to the product of vertical high frequency component VHFC6 of pixel P6 with the difference between one and horizontal offset H_O plus the product of vertical high frequency component VHFC7 of pixel P7 with horizontal offset H_O. Equation EQ9 shows symbolically how to calculate top high frequency component THFC.

$$THFC = VHFC6*(1-H\_O) + VHFC7*H\_O \quad (EQ9)$$

Similarly, position adjustment unit 470 calculates a bottom high frequency component BHFC, which is equal to a weighted sum of the vertical high frequency components of the two closest pixels below current position CP, i.e. pixels P10 and P11. Specifically, bottom high frequency component BHFC is equal to the product of vertical high frequency component VHFC10 of pixel P10 with the difference between one and horizontal offset H_O plus the product of vertical high frequency component VHFC11 of pixel P11 with horizontal offset H_O. Equation EQ10 shows symbolically how to calculate bottom high frequency component BHFC.

$$BHFC = VHFC10*(1-H\_O) + VHFC11*H\_O \quad (EQ10)$$

As explained above high frequency adjusted position HFAP is moved vertically in the direction of the larger magnitude of vertical high-frequency component. The magnitude of a vertical high-frequency component is equal to the absolute value of the vertical high frequency component. Thus, when the absolute value of bottom high frequency component BHFC is greater than the absolute value of top high frequency component THFC then the high frequency adjusted position HFAP should be moved below corresponding position CP. Conversely, when the absolute value of bottom high frequency component BHFC is less than the absolute value of top high frequency component THFC then the high frequency adjusted position HFAP should be moved above corresponding position CP. However, when the absolute value of bottom high frequency component BHFC is equal to the absolute value of top high frequency component THFC then the high frequency adjusted position HFAP should not be moved vertically from corresponding position CP and vertical high frequency adjustment VHFPA should be equal to zero.

The amount of high frequency position adjustment is in proportion to the absolute difference between absolute top high frequency components and absolute bottom high frequency components. Therefore, position adjustment unit 470 calculates a vertical high frequency difference VHFD, which is equal to the absolute value of the difference between the absolute value of bottom high frequency component BHFC and the absolute value of top high frequency component TFHC. Equation EQ11 shows symbolically how to calculate vertical high frequency difference VHFD.

$$VHFD = ||BHFC| - |THFC|| \quad (EQ11)$$

As with horizontal high frequency position adjustment HHFPA, high frequency difference threshold HFDT is also used to limit the amplitude of vertical high frequency difference VHFD. Specifically, if vertical high frequency difference VHFD is greater than high frequency difference threshold, then vertical high frequency difference VHFD is reset to be equal to high frequency difference threshold. Furthermore, interpolation point adjustment parameter IPAP, is also used to control the vertical adjustment of high frequency adjusted position HFAP.

The magnitude of vertical position adjustment MVPA is equal to vertical scaling factor VSF multiplied by interpolation adjustment parameter IPAP, multiplied by vertical high frequency difference VHFD divided by high frequency difference threshold HFDT. As explained above, dividing by high frequency difference threshold HFDT can be avoided by multiplying with the reciprocal of high frequency difference threshold HFDT. Equation EQ12 shows symbolically how to calculate magnitude of vertical position adjustment MVPA. In equation EQ12, vertical scaling factor VSF is equivalent to a "vertical step" between two pixels of the scaled image.

$$MVPA = VSF*IPAP*(VHFD/HFDT) \quad (EQ12)$$

When the absolute value of bottom high frequency component BHFC is greater than the absolute value of top high frequency component THFC then the high frequency adjusted position HFAP should be moved below corresponding position CP. However, as explained above, in most embodiments of the present invention, high frequency adjusted position HFAP should not move beyond pixels P6, P7, P10, and P11 because additional pixels would be needed to for interpolation. Therefore, when the absolute value of bottom high frequency component BHFC is greater than the absolute value of top high frequency component THFC and one minus vertical offset V_O is greater than or equal to magnitude of vertical position adjustment MVPA then vertical high frequency position adjustment is equal to magnitude of vertical position adjustment MVPA. However, when the absolute value of bottom high frequency component BHFC is greater than the absolute value of top high frequency component THFC and one minus vertical offset V_O is less than magnitude of vertical position adjustment MVPA then vertical high frequency position adjustment is equal to one minus vertical offset V_O.

Conversely, when the absolute value of bottom high frequency component BHFC is less than the absolute value of top high frequency component THFC then the high frequency adjusted position HFAP should be moved above corresponding position CP. However, high frequency adjusted position HFAP should not move beyond pixels P6 and P7 in the vertical direction. Therefore, when the absolute value of bottom high frequency component BHFC is less than the absolute value of top high frequency component THFC and vertical offset V_O is greater than magnitude of vertical position adjustment MVPA then vertical high frequency position adjustment is equal to magnitude of vertical position adjustment MVPA multiplied by negative one. However, if vertical offset V_O is less than magnitude of vertical position adjustment MVPA, vertical high frequency position adjustment VHFPA is equal to vertical offset V_O multiplied by negative one.

When the absolute value of bottom high frequency component BHFC is equal to the absolute value of top high frequency component THFC then the high frequency adjusted position HFAP should not be moved from corresponding position CP and vertical high frequency adjustment VHFPA should be equal to zero.

Table 2 provides a pseudo code listing which shows symbolically how to calculate vertical high frequency position adjustment VHFPA.

TABLE 2

```
{
    IF |THFC| > |BHFC| then
    {
        IF V_O >= MVPA then VHFPA = -MVPA
        ELSE VHFPA = - V_O;
    }
    ELSE IF |THFC| < |BHFC| then
    {
        IF (1- V_O) >= MVPA then VHFPA = MVPA
        ELSE VHFPA = (1 - V_O) ;
    }
    ELSE IF |THFC| = |BHFC| then VHFPA = 0;
}
```

Returning to FIG. 4, sharpness compensation unit 480, which receives the various high frequency components from local high frequency components calculation unit 460, horizontal high frequency position adjustment HHFPA and vertical high frequency position adjustment VHFPA from position adjustment unit 470 and a user configurable sharpness control parameter SCP, generates sharpness compensation S_C for adder 440. Specifically, sharpness compensation unit 480 generates sharpness compensation S_C to be equal to sharpness control parameter SCP multiplied by an interpolation at high frequency adjusted position HFAP of the high-frequency components of pixels P6, P7, P10, and P11. For example, in one embodiment of the present invention, a zero-th order interpolation is used so that sharpness compensation S_C is equal to sharpness control parameter SCP multiplied by the sum of high frequency components of the pixel closest to high frequency adjusted position HFAP. Another embodiment of the present invention uses a bilinear interpolation, i.e. sharpness compensation S_C to be equal to sharpness control parameter SCP multiplied by a bilinear interpolation at high frequency adjusted position HFAP of the high-frequency components of pixels P6, P7, P10, and P11. Equation EQ13 shows symbolically how to calculate sharpness compensation S_C using a bilinear interpolation. Higher order interpolation techniques could also be used. However, the high frequency components of additional pixels may be necessary for other interpolation techniques.

$$S\_C = SCP * [(V\_O + VHFPA) * (HHFC10 + VHFC10 - HHFC6 - VHFC6) + (H\_O + HHFPA) * (V\_O + VHFPA) * (HHFC6 + VHFC6 + HHFC11 + VHFC11 - HHFC7 - VHFC7 - HHFC10 - VHFC10) + (H\_O + HHFPA) * (HHFC7 + VHFC7 - HHFC6 - VHFC6) + HHFC6 + VHFC6] \quad (EQ13)$$

Sharpness control parameter SCP can be any real number. However to reduce the complexity of sharpness compensation unit 480, sharpness control parameter is usually limited to a smaller range such as negative 8 to positive 8, inclusive. Positive values of sharpness control parameter SCP enhance the sharpness of the resulting image while negative values of sharpness control parameter SCP reduce the sharpness of the resulting image. Therefore, when image scaler 400 is up-scaling in image (i.e. enlarging an image), sharpness control parameter SCP should be positive to enhance sharpness, which would reduce the blurring problem described above. However, if image scaler 400 is down-scaling an image (i.e. reducing an image) sharpness control parameter SCP should be negative to reduce sharpness, which would reduce the graininess problem described above. To switch off sharpness compensation, sharpness control parameter SCP should be set to zero, which would force sharpness compensation S_C to be equal to zero.

In some embodiments of the present invention, sharpness compensation unit 480 includes a sharpness compensation threshold SCT, which limits the magnitude of sharpness compensation S_C. Specifically, if sharpness compensation S_C is greater than sharpness compensation threshold SCT, sharpness compensation S_C is set equal to sharpness compensation threshold SCT. Conversely, if sharpness compensation S_C is less than sharpness compensation threshold SCT multiplied by negative one, sharpness compensation S_C is set equal to sharpness compensation threshold SCT multiplied by negative one. Some embodiments of the present invention may include a sharpness compensation coring threshold SCCT. When sharpness compensation S_C is larger than negative one multiplied by sharpness compensation coring threshold SCCT and smaller than sharpness compensation coring threshold SCCT, sharpness compensation S_C is set equal to zero. Sharpness compensation coring threshold SCCT is used to avoid affecting of small changes in pixel luminance caused by noise.

In the various embodiments of the present invention, novel structures and methods have been described for scaling images. The various embodiments of the structures and methods of this invention that are described above are illustrative only of the principles of this invention and are not intended to limit the scope of the invention to the particular embodiments described. For example, in view of this disclosure those skilled in the art can define other scaling techniques, high frequency components, scaling units, position adjustment units, sharpness compensation units, video buffers, and so forth, and use these alternative features to create a method, circuit, or system according to the principles of this invention. Thus, the invention is limited only by the following claims.

What is claimed is:

1. A method of scaling an original image to produce a scaled image, the method comprising:
    calculating a corresponding position in the original image for a current pixel of the scaled image, wherein the corresponding position includes a horizontal position and a vertical position;
    calculating a high frequency adjusted position in the original image for the current pixel, wherein the high frequency adjusted position includes a high frequency adjusted horizontal position and a high frequency adjusted vertical position, and wherein the high frequency adjusted position is moved horizontally in a horizontal direction of larger horizontal high frequency components; and
    generating pixel values for the current pixel using the high frequency adjusted position.

2. The method of claim 1, wherein the high frequency adjusted position is moved vertically in a vertical direction of larger vertical high frequency components.

3. The method of claim 1, wherein the calculating a high frequency adjusted position in the original image for the current pixel further comprises calculating a left high frequency component and a right high frequency component.

4. The method of claim 1, wherein the calculating a high frequency adjusted position for the current pixel further comprises:
calculating a horizontal high frequency position adjustment;
calculating a vertical high frequency position adjustment.

5. The method of claim 4, further comprising calculating a plurality of high frequency components.

6. The method of claim 5, wherein the plurality of high frequency components comprises a plurality of horizontal high frequency components and a plurality of vertical high frequency components.

7. The method of claim 1, wherein the pixel values comprises a luminance value and further comprising adding a sharpness compensation to the luminance value.

8. The method of claim 7, wherein the sharpness compensation is proportional to an interpolation at the high frequency adjusted position of high frequency components of a plurality of pixels near the corresponding position.

9. The method of claim 7, wherein the sharpness compensation is equal to a sharpness compensation parameter multiplied by a bilinear interpolation at the high frequency adjusted position of the high frequency components of a plurality of four pixels nearest the corresponding position.

10. The method of claim 8, wherein the plurality of pixels comprise four pixels closest to the corresponding position.

11. The method of claim 8, wherein the plurality of pixels comprises a first pixel above and to the left of the corresponding position, a second pixel above and to the right of the corresponding position, a third pixel below and to the left of the corresponding position and a fourth pixel below and to the right of the corresponding position.

12. A method of scaling an original image to produce a scaled image, the method comprising:
calculating a corresponding position in the original image for a current pixel of the scaled image, wherein the corresponding position includes a horizontal position and a vertical position;
calculating a high frequency adjusted position in the original image for the current pixel, wherein the high frequency adjusted position includes a high frequency adjusted horizontal position and a high frequency adjusted vertical position; and
generating pixel values for the current pixel using the high frequency adjusted position;
wherein the calculating a high frequency adjusted position in the original image for the current pixel further comprises calculating a left high frequency component and a right high frequency component; and
wherein the high frequency adjusted horizontal position is to the right of the horizontal position when the absolute value of the right high frequency component is greater than the absolute value of the left high frequency component.

13. The method of claim 12, wherein the high frequency adjusted horizontal position is to the left of the horizontal position when the absolute value of the left high frequency component is greater than the absolute value of the right high frequency component.

14. The method of claim 13, wherein the high frequency adjusted horizontal position is equal to the horizontal position when the absolute value of the left high frequency component is equal to the absolute value of the right high frequency component.

15. A method of scaling an original image to produce a scaled image, the method comprising:
calculating a corresponding position in the original image for a current pixel of the scaled image, wherein the corresponding position includes a horizontal position and a vertical position;
calculating a high frequency adjusted position in the original image for the current pixel, wherein the high frequency adjusted position includes a high frequency adjusted horizontal position and a high frequency adjusted vertical position, and
generating pixel values for the current pixel using the high frequency adjusted position;
wherein the calculating a high frequency adjusted position in the original image for the current pixel further comprises:
calculating a left high frequency component and a right high frequency component; and
calculating a horizontal high frequency difference equal to the absolute value of the absolute value of the right high frequency component minus the absolute value of the left high frequency component.

16. The method of claim 15, wherein a horizontal distance between the high frequency adjusted horizontal position and the horizontal position is proportional to the horizontal high frequency difference.

17. A method of scaling an original image to produce a scaled image, the method comprising:
calculating a corresponding position in the original image for a current pixel of the scaled image, wherein the corresponding position includes a horizontal position and a vertical position;
calculating a high frequency adjusted position in the original image for the current pixel, wherein the high frequency adjusted position includes a high frequency adjusted horizontal position and a high frequency adjusted vertical position; and
generating pixel values for the current pixel using the high frequency adjusted position;
wherein the calculating a high frequency adjusted position in the original image for the current pixel further comprises
calculating a left high frequency component and a right high frequency component;
calculating a top high frequency component and a bottom high frequency component.

18. The method of claim 17, wherein
the high frequency adjusted vertical position is above the vertical position when the absolute value of the top high frequency component is greater than the absolute value of the bottom high frequency component;
the high frequency adjusted vertical position is below the vertical position when the absolute value of the bottom high frequency component is greater than the absolute value of the top high frequency component; and
the high frequency adjusted vertical position is equal to the vertical position when the absolute value of the top high frequency component is equal to the absolute value of the bottom high frequency component.

19. The method of claim 17, further comprising calculating a vertical high frequency difference equal to the absolute value of the absolute value of the top high frequency component minus the absolute value of the bottom high frequency component.

20. The method of claim 19, wherein a vertical distance between the high frequency adjusted vertical position and the vertical position is proportional to the vertical high frequency difference.

21. A method of scaling an original image to produce a scaled image, the method comprising:
calculating a corresponding position in the original image for a current pixel of the scaled image, wherein the corresponding position includes a horizontal position and a vertical position;
calculating a high frequency adjusted position in the original image for the current pixel, wherein the high frequency adjusted position includes a high frequency adjusted horizontal position and a high frequency adjusted vertical position; and
generating pixel values for the current pixel using the high frequency adjusted position;
wherein the calculating a high frequency adjusted position in the original image for the current pixel further comprises calculating a top high frequency component and a bottom high frequency component.

22. The method of claim 21, wherein
the high frequency adjusted vertical position is above the vertical position when the absolute value of the top high frequency component is greater than the absolute value of the bottom high frequency component;
the high frequency adjusted vertical position is below the vertical position when the absolute value of the bottom high frequency component is greater than the absolute value of the top high frequency component; and
the high frequency adjusted vertical position is equal to the vertical position when the absolute value of the top high frequency component is equal to the absolute value of the bottom high frequency component.

23. A method of scaling an original image to produce a scaled image, the method comprising:
calculating a corresponding position in the original image for a current pixel of the scaled image, wherein the corresponding position includes a horizontal position and a vertical position;
calculating a high frequency adjusted position in the original image for the current pixel, wherein the high frequency adjusted position includes a high frequency adjusted horizontal position and a high frequency adjusted vertical position; and
generating pixel values for the current pixel using the high frequency adjusted position; and
wherein the calculating a high frequency adjusted position for the current pixel further comprises:
calculating a horizontal high frequency position adjustment;
calculating a vertical high frequency position adjustment; and
wherein the high frequency adjusted horizontal position is equal to the horizontal position plus the horizontal high frequency position adjustment and the high frequency adjusted vertical position is equal to the vertical position plus the vertical high frequency position adjustment.

24. A method of scaling an original image to produce a scaled image, the method comprising:
calculating a corresponding position in the original image for a current pixel of the scaled image, wherein the corresponding position includes a horizontal position and a vertical position;
calculating a high frequency adjusted position in the original image for the current pixel, wherein the high frequency adjusted position includes a high frequency adjusted horizontal position and a high frequency adjusted vertical position, and wherein the calculating a high frequency adjusted position for the current pixel further comprises:
calculating a horizontal high frequency position adjustment;
calculating a vertical high frequency position adjustment and
generating pixel values for the current pixel using the high frequency adjusted position;
calculating a plurality of high frequency components, wherein the plurality of high frequency components comprises a plurality of horizontal high frequency components and a plurality of vertical high frequency components; and
wherein
the corresponding position is bounded by a first pixel above and to the left of the corresponding position, a second pixel above and to the right of the corresponding position, a third pixel below and to the left of the corresponding position and a fourth pixel below and to the right of the corresponding position;
the plurality of vertical high frequency components comprises a first vertical high frequency component, a second vertical high frequency component, a third vertical high frequency component, and a fourth vertical high frequency component corresponding to the first pixel, the second pixel, the third pixel, and the fourth pixel, respectively; and
the plurality of horizontal high frequency components comprises a first horizontal high frequency component, a second horizontal high frequency component, a third horizontal high frequency component, and a fourth horizontal high frequency component corresponding to the first pixel, the second pixel, the third pixel, and the fourth pixel, respectively.

25. The method of claim 24, wherein the calculating a high frequency adjusted position in the original image for the current pixel further comprises calculating a left high frequency component and a right high frequency component, wherein the left high frequency component is equal to a first weighted sum of the first horizontal high frequency component and the third horizontal high frequency component and the right high frequency component is equal to a second weighted sum of the second horizontal high frequency component and the fourth horizontal high frequency component.

26. The method of claim 25, wherein
the high frequency adjusted horizontal position is to the right of the horizontal position when the absolute value of the right high frequency component is greater than the absolute value of the left high frequency component;
the high frequency adjusted horizontal position is to the left of the horizontal position when the absolute value of the left high frequency component is greater than the absolute value of the right high frequency component; and
the high frequency adjusted horizontal position is equal to the horizontal position when the absolute value of the left high frequency component is equal to the absolute value of the right high frequency component.

27. The method of claim 26, further comprising calculating a horizontal high frequency difference equal to the absolute value of the absolute value of the right high frequency component minus the absolute value of the left high frequency component.

28. The method of claim 27, wherein a horizontal distance between the high frequency adjusted horizontal position and the horizontal position is proportional to the horizontal high frequency difference.

29. The method of claim 24, wherein the calculating a high frequency adjusted position in the original image for the current pixel further comprises calculating a top high frequency component and a bottom high frequency component, wherein the top high frequency component is equal to a first weighted sum of the first vertical high frequency component and the second vertical high frequency component and the bottom high frequency component is equal to a second weighted sum of the third vertical high frequency component and the fourth vertical high frequency component.

30. The method of claim 29, wherein
the high frequency adjusted vertical position is above the vertical position when the absolute value of the top high frequency component is greater than the absolute value of the bottom high frequency component;
the high frequency adjusted vertical position is below the vertical position when the absolute value of the bottom high frequency component is greater than the absolute value of the top high frequency component; and
the high frequency adjusted vertical position is equal to the vertical position when the absolute value of the top high frequency component is equal to the absolute value of the bottom high frequency component.

31. The method of claim 30, further comprising calculating a vertical high frequency difference equal to the absolute value of the absolute value of the top high frequency component minus the absolute value of the bottom high frequency component.

32. The method of claim 31, wherein a vertical distance between the high frequency adjusted vertical position and the vertical position is proportional to the vertical high frequency difference.

33. An image scaler for scaling an original image to produce a scaled image, the image scaler comprising:
means for calculating a corresponding position in the original image for a current pixel of the scaled image, wherein the corresponding position includes a horizontal position and a vertical position;
means for calculating a high frequency adjusted position in the original image for the current pixel, wherein the high frequency adjusted position includes a high frequency adjusted horizontal position and a high frequency adjusted vertical position, and wherein the high frequency adjusted position is moved horizontally in a horizontal direction of larger horizontal high frequency components; and
means for generating pixel values for the current pixel using the high frequency adjusted position.

34. The image scaler of claim 33, wherein the high frequency adjusted position is moved vertically in a vertical direction of larger vertical high frequency components.

35. The image scaler of claim 33, wherein the means for calculating a high frequency adjusted position in the original image for the current pixel further comprises means for calculating a left high frequency component and a right high frequency component.

36. The image scaler of claim 33, wherein the means for calculating a high frequency adjusted position for the current pixel further comprises:
means for calculating a horizontal high frequency position adjustment; and
means for calculating a vertical high frequency position adjustment.

37. The image scaler of claim 33, wherein the pixel values comprises a luminance value and further comprising means for adding a sharpness compensation to the luminance value.

38. The image scaler of claim 37, wherein the sharpness compensation is proportional to an interpolation at the high frequency adjusted position of high frequency components of a plurality of pixels near the corresponding position.

39. The image scaler of 38, wherein the plurality of pixels comprises a first pixel above and to the left of the corresponding position, a second pixel above and to the right of the corresponding position, a third pixel below and to the left of the corresponding position and a fourth pixel below and to the right of the corresponding position.

40. The image scaler of claim 37, wherein the sharpness compensation is equal to a sharpness compensation parameter multiplied by a bilinear interpolation at the high frequency adjusted position of the high frequency components of a plurality of four pixels nearest the corresponding position.

41. An image scaler for scaling an original image to produce a scaled image, the image scaler comprising:
means for calculating a corresponding position in the original image for a current pixel of the scaled image, wherein the corresponding position includes a horizontal position and a vertical position;
means for calculating a high frequency adjusted position in the original image for the current pixel, wherein the high frequency adjusted position includes a high frequency adjusted horizontal position and a high frequency adjusted vertical position, wherein the means for calculating a high frequency adjusted position in the original image for the current pixel further comprises means for calculating a left high frequency component and a right high frequency component and
means for generating pixel values for the current pixel using the high frequency adjusted position; and
wherein
the high frequency adjusted horizontal position is to the right of the horizontal position when the absolute value of the right high frequency component is greater than the absolute value of the left high frequency component;
the high frequency adjusted horizontal position is to the left of the horizontal position when the absolute value of the left high frequency component is greater than the absolute value of the right high frequency component; and
the high frequency adjusted horizontal position is equal to the horizontal position when the absolute value of the left high frequency component is equal to the absolute value of the right high frequency component.

42. An image scaler for scaling an original image to produce a scaled image, the image scaler comprising:
means for calculating a corresponding position in the original image for a current pixel of the scaled image, wherein the corresponding position includes a horizontal position and a vertical position;
means for calculating a high frequency adjusted position in the original image for the current pixel, wherein the high frequency adjusted position includes a high frequency adjusted horizontal position and a high frequency adjusted vertical position, wherein the means for calculating a high frequency adjusted position in the original image for the current pixel further comprises means for calculating a left high frequency component and a right high frequency component;

means for generating pixel values for the current pixel using the high frequency adjusted position; and means for calculating a horizontal high frequency difference equal to the absolute value of the absolute value of the right high frequency component minus the absolute value of the left high frequency component.

43. The image scaler of claim 42, wherein a horizontal distance between the high frequency adjusted horizontal position and the horizontal position is proportional to the horizontal high frequency difference.

44. An image scaler for scaling an original image to produce a scaled image, the image scaler comprising:

means for calculating a corresponding position in the original image for a current pixel of the scaled image, wherein the corresponding position includes a horizontal position and a vertical position;

means for calculating a high frequency adjusted position in the original image for the current pixel, wherein the high frequency adjusted position includes a high frequency adjusted horizontal position and a high frequency adjusted vertical position, wherein the means for calculating a high frequency adjusted position in the original image for the current pixel further comprises:

means for calculating a left high frequency component and a right high frequency component, and means for calculating a top high frequency component and a bottom high frequency component; and means for generating pixel values for the current pixel using the high frequency adjusted position.

45. The image scaler of claim 44, wherein the high frequency adjusted vertical position is above the vertical position when the absolute value of the top high frequency component is greater than the absolute value of the bottom high frequency component;

the high frequency adjusted vertical position is below the vertical position when the absolute value of the bottom high frequency component is greater than the absolute value of the top high frequency component; and the high frequency adjusted vertical position is equal to the vertical position when the absolute value of the top high frequency component is equal to the absolute value of the bottom high frequency component.

46. The image scaler of claim 44, further comprising means for calculating a vertical high frequency difference equal to the absolute value of the absolute value of the top high frequency component minus the absolute value of the bottom high frequency component.

47. The image scaler of claim 46, wherein a vertical distance between the high frequency adjusted vertical position and the vertical position is proportional to the vertical high frequency difference.

48. An image scaler for scaling an original image to produce a scaled image, the image scaler comprising:

means for calculating a corresponding position in the original image for a current pixel of the scaled image, wherein the corresponding position includes a horizontal position and a vertical position;

means for calculating a high frequency adjusted position in the original image for the current pixel having means for calculating a horizontal high frequency position adjustment;

means for calculating a vertical high frequency position adjustment; and wherein the high frequency adjusted position includes a high frequency adjusted horizontal position and a high frequency adjusted vertical position; and means for generating pixel values for the current pixel using the high frequency adjusted position; and wherein the high frequency adjusted horizontal position is equal to the horizontal position plus the horizontal high frequency position adjustment and the high frequency adjusted vertical position is equal to the vertical position plus the vertical high frequency position adjustment.

49. The image scaler of claim 48, further comprising means for calculating a plurality of high frequency components.

50. The image scaler of claim 49, wherein the plurality of high frequency components comprises a plurality of horizontal high frequency components and a plurality of vertical high frequency components.

51. The image scaler of claim 50, wherein the corresponding position is bounded by a first pixel above and to the left of the corresponding position, a second pixel above and to the right of the corresponding position, a third pixel below and to the left of the corresponding position and a fourth pixel below and to the right of the corresponding position;

the plurality of vertical high frequency components comprises a first vertical high frequency component, a second vertical high frequency component, a third vertical high frequency component, and a fourth vertical high frequency component corresponding to the first pixel, the second pixel, the third pixel, and the fourth pixel, respectively; and the plurality of horizontal high frequency components comprises a first horizontal high frequency component, a second horizontal high frequency component, a third horizontal high frequency component, and a fourth horizontal high frequency component corresponding to the first pixel, the second pixel, the third pixel, and the fourth pixel, respectively.

52. The image scaler of claim 51, wherein the means for calculating a high frequency adjusted position in the original image for the current pixel further comprises:

means for calculating a left high frequency component and a right high frequency component, wherein the left high frequency component is equal to a first weighted sum of the first horizontal high frequency component and the third horizontal high frequency component and the right high frequency component is equal to a second weighted sum of the second horizontal high frequency component and the fourth horizontal high frequency component; and means for calculating a top high frequency component and a bottom high frequency component, wherein the top high frequency component is equal to a first weighted sum of the first vertical high frequency component and the second vertical high frequency component and the bottom high frequency component is equal to a second weighted sum of the third vertical high frequency component and the fourth vertical high frequency component.

53. The image scaler of claim 52, wherein the high frequency adjusted horizontal position is to the right of the horizontal position when the absolute value of the right high frequency component is greater than the absolute value of the left high frequency component;

the high frequency adjusted horizontal position is to the left of the horizontal position when the absolute value of the left high frequency component is greater than the absolute value of the right high frequency component;

the high frequency adjusted horizontal position is equal to the horizontal position when the absolute value of the left high frequency component is equal to the absolute value of the right high frequency component;

the high frequency adjusted vertical position is above the vertical position when the absolute value of the top high frequency component is greater than the absolute value of the bottom high frequency component;

the high frequency adjusted vertical position is below the vertical position when the absolute value of the bottom high frequency component is greater than the absolute value of the top high frequency component; and the high frequency adjusted vertical position is equal to the vertical position when the absolute value of the top high frequency component is equal to the absolute value of the bottom high frequency component.

54. The image scaler of claim 53, further comprising:
means for calculating a horizontal high frequency difference equal to the absolute value of the absolute value of the right high frequency component minus the absolute value of the left high frequency component; and
means for calculating a vertical high frequency difference equal to the absolute value of the absolute value of the top high frequency component minus the absolute value of the bottom high frequency component.

55. The image scaler of claim 54, wherein a horizontal distance between the high frequency adjusted horizontal position and the horizontal position is proportional to the horizontal high frequency difference and a vertical distance between the high frequency adjusted vertical position and the vertical position is proportional to the vertical high frequency difference.

56. An image scaler for scaling an original image to produce a scaled image, the image scaler comprising: a processor coupled to a buffer, the processor comprising: a corresponding position calculation unit configured to calculate a corresponding position in the original image for a current pixel of the scaled image, wherein the corresponding position includes a horizontal position and a vertical position; a position adjustment unit configured to calculate a horizontal high frequency position adjustment and a vertical high frequency position adjustment; a first adder coupled to the corresponding position calculation unit and the position adjustment unit configured to calculate a high frequency adjusted position in the original image for the current pixel, wherein the high frequency adjusted position includes a high frequency adjusted horizontal position equal to the horizontal position plus the horizontal high frequency position adjustment and a high frequency adjusted vertical position equal to the vertical position plus the vertical high frequency position adjustment; and a scaling unit configured to generate pixel values for the current pixel using the high frequency adjusted position.

57. The image scaler of claim 56, wherein the high frequency adjusted position is moved horizontally in a horizontal direction of larger horizontal high frequency components.

58. The image scaler of claim 57, wherein the high frequency adjusted position is moved vertically in a vertical direction of larger vertical high frequency components.

59. The image scaler of claim 56, further comprising a local high frequency components calculation unit coupled to the position adjustment unit.

60. The image scaler of claim 59, wherein the local high frequency components calculation unit is configured to calculate high frequency components of a plurality of pixels in the original image.

61. The image scaler of claim 59, further comprising a sharpness compensation unit coupled to the local high frequency components calculation unit.

62. The image scaler of claim 61, wherein the sharpness compensation unit is configured to calculate a sharpness compensation for the current pixel.

63. The image scaler of claim 62, further comprising a second adder coupled to the scaling unit and the sharpness compensation unit.

64. The image scaler of claim 63, wherein the second adder is configured to add the sharpness compensation to a luminance value of the current pixel.

* * * * *